United States Patent [19]

Funabashi et al.

[11] Patent Number: 5,296,430
[45] Date of Patent: Mar. 22, 1994

[54] METHOD FOR THE PREPARATION OF A STABILIZED CATALYST FOR THE POLYMERIZATION OF OLEFINS

[75] Inventors: Hideo Funabashi; Yoichi Matsuo; Shigeo Iwasaki, all of Ichihara, Japan

[73] Assignee: Idemitsu Petrochemical Company, Ltd., Tokyo, Japan

[21] Appl. No.: 43,626

[22] Filed: Apr. 7, 1993

Related U.S. Application Data

[63] Continuation of Ser. No. 799,103, is a continuation-in-part of Ser. No. 580,799, Sep. 11, 1990, abandoned.

[30] Foreign Application Priority Data

Sep. 20, 1989 [JP] Japan .................................. 1-242030

[51] Int. Cl.$^5$ ............................................. C08F 4/651
[52] U.S. Cl. ................................. 502/108; 502/120; 526/138
[58] Field of Search ............................. 502/108, 120

[56] References Cited

U.S. PATENT DOCUMENTS 4,921,920  5/1990  Collomb-Ceccarini ............ 502/120

FOREIGN PATENT DOCUMENTS

WO86/00314  1/1986  PCT Int'l Appl. ................ 502/108

*Primary Examiner*—Patrick P. Garvin
*Attorney, Agent, or Firm*—Wyatt, Gerber, Burke and Badie

[57] ABSTRACT

A so-called Ziegler catalyst composed of a titanium halide-containing solid ingredient and an organoaluminum compound for the polymerization of olefins can be imparted with greatly improved storage stability by first subjecting the catalytic composition to a pre polymerization treatment and then to a contacting treatment with carbon dioxide and/or carbon monoxide. The catalytic activity is almost unchanged even after storage of the stabilized catalyst for 90 days or longer in nitrogen gas. The stabilized catalyst can also be used advantageously in a continuous-process polymerization of propylene by continuously introducing the monomer carrying the catalyst owing to absence of blocking of the pipe line with the polymer formed in-line.

7 Claims, No Drawings

METHOD FOR THE PREPARATION OF A STABILIZED CATALYST FOR THE POLYMERIZATION OF OLEFINS

This application is a continuation of application Ser. No. 07/799,103, filed Nov. 27, 1991 (now abandoned) which in turn is a continuation-in-part of application Ser. No. 07/580,799, filed Sep. 11, 1990 (now abandoned).

BACKGROUND OF THE INVENTION

The present invention relates to a method for the preparation of a stabilized catalyst for the polymerization of an olefin. More particularly, the invention relates to an efficient method for the preparation of a stabilized catalyst for the polymerization of an olefin having excellent activity and durability as a catalyst and an advantage that the catalyst can be introduced into the polymerization reactor together with the monomer as a carrier without the troubles of eventual blocking of pipe lines for the introduction of the same.

The catalysts for the polymerization of olefins conventionally and widely used in the prior art are the so-called Ziegler catalysts comprising a titanium halide-containing solid ingredient and an organoaluminum compound. It is known that such a polymerization catalyst can be imparted with increased stability when the catalyst is subjected in advance to a so-called pre-polymerization treatment or a preliminary polymerization by being brought into contact with a small amount of the olefin monomer for which the stabilized catalyst is intended to be used prior to the actual use of the catalyst in the polymerization process so that the amount of a fine powder of the catalyst formed by attritional disintegration can be decreased along with enhancement of the catalytic performance in the activity for the polymerization and stereospecificity of the polymer produced therewith (see, for example, Japanese Patent Publications 49-37835, 52-39781, 54-34714, 57-45244 and 58-1289 and Japanese Patent Kokai 55-123607 and 59-6205).

Since the polymerization catalyst is in an activated state even after the pre-polymerization treatment, however, the catalytic performance thereof is unavoidably unstable in respect of the catalytic activity and stereo-specificity of the polymer product even by washing the catalyst with an inert organic solvent such as hexane and heptane so that the catalytic performance is always subject to a gradual decrease in the lapse of time in addition to the problem that, when the catalyst is introduced into the polymerization reactor together with the monomer dissolved in a suitable medium, the pipe line for the introduction is sometimes blocked by the polymer formed in situ.

Recently, Collomb-Ceccarini et al. disclosed in U.S. Pat. No. 4,921,920 that a Ziegler-Natta type catalyst after a pre-polymerization treatment can be stabilized by contacting with a polymerization inhibiting agent such as carbon monoxide or carbon dioxide under a pressure between 0.01 and 1 MPa, for example, at 80° C. for 1 hour. The stabilizing effect obtained thereby is, however, still quite insufficient.

SUMMARY OF THE INVENTION

In view of the above described problems and disadvantages in the prior art catalysts for the polymerization of olefins prepared by the pre-polymerization treatment, the present invention accordingly has an object to provide a novel and efficient method for the preparation of a stabilized catalyst for the polymerization of an olefin having excellent catalytic performance which is free from gradual decrease in the lapse of time when the catalyst is stored over a long period of time along with another advantage that the drawbacks due to blocking of the pipe lines by the polymer formed in situ can be avoided even by introducing the catalyst together with a polymerization medium containing the monomer.

Thus, the method of the present invention for the preparation of a catalyst for the polymerization of an olefin having stabilized catalytic performance comprises the steps of:

(a) subjecting a catalytic composition comprising a titanium halide containing solid ingredient and an organoaluminum compound to a pre-polymerization treatment by contacting with an olefin monomer; and (b) bringing the catalytic composition after the pre-polymerization treatment in step (a) into contact with carbon monoxide, carbon dioxide or a mixture thereof as a stabilizing agent undiluted or diluted with an inert gas at a temperature in the range from 0° to 100° C. or, preferably, from 20° to 50° C. for a length of time of at least 600 minutes or, preferably, at least 1000 minutes, the amount of the stabilizing agent being at least 10% by moles or, preferably, at least 15% by moles based on the amount of the titanium atoms in the catalyst.

DETAILED DESCRIPTION OF THE PREFERRED EMBODIMENTS

The catalytic composition subjected to the pre-polymerization treatment in step (a) comprises, as the essential ingredients, a titanium halide-containing solid ingredient and an organoaluminum compound. The titanium halide-containing solid ingredient includes those containing a titanium trichloride ingredient and those containing a carrier-type ingredient consisting of a magnesium compound and a titanium halide. Several different types of the titanium trichloride-containing solid ingredients, of which the principal ingredient is titanium trichloride, are known in the prior art including, for example, a compound obtained by the treatment of titanium trichloride, which is prepared by the reduction of titanium tetrachloride with an organoaluminum compound, with an electron donor compound and titanium tetrachloride as disclosed in Japanese Patent Publication 52-3358. a compound obtained by the treatment of titanium trichloride, which is prepared by the reduction of titanium tetrachloride with a reaction product of an organoaluminum compound and an electron donor compound, with an electron donor compound and titanium tetrachloride as disclosed in Japanese Patent Publication 53-28573 and a so-called titanium trichloride AA which is prepared by the reduction of titanium tetrachloride with metallic aluminum followed by fine pulverization to effect activation.

On the other hand, the magnesium compound in the carrier type ingredient is exemplified by metallic magnesium, alkyl magnesium halides and dialkyl magnesium-magnesium halides obtained by the reaction of metallic magnesium with a halogenated hydrocarbon compound magnesium hydroxide, magnesium oxychloride, magnesium dialkoxides, alkoxy magnesium halides, magnesium salts of organic acids as well as the magnesium compounds obtained by the reaction thereof with a halogenating agent, and so on. These magnesium compounds can be used either singly or as a combination of two kinds or more according to need.

The halogenated titanium compound in the carrier-type ingredient can be a compound represented by the general formula $$Ti(OR')_{4-n}X_n, \quad (I)$$

in which $R^1$ is a hydrocarbon group, preferably, having 1 to 10 carbon atoms, X is an atom of halogen and n is an integer of 1 to 4, or a combination of a tetraalkoxy titanium represented by the general formula $$Ti(OR')_4, \quad (II)$$

in which $R^1$ has the same meaning as defined above, with a halogenating agent.

The above mentioned halogenated titanium compound is exemplified by titanium tetrachloride, titanium tetrabromide, ethoxy titanium trichloride, diethoxy titanium dichloride, triethoxy titanium chloride, propoxy titanium trichloride, n-butoxy titanium trichloride, di-n-butoxy titanium dichloride, ethoxy titanium tribromide and ethoxy dibutoxy titanium chloride as well as a combination of a tetraalkoxy titanium, such as tetramethoxy titanium, tetraethoxy titanium, tetrapropoxy titanium, tetra-n-butoxy titanium and the like, with a halogenating agent. These halogenated titanium compounds can be used either singly or as a combination of two kinds or more according to need.

The above mentioned carrier-type ingredient can be prepared by any known method without particular limitations including the methods conventionally undertaken in the preparation of the solid ingredient in the Ziegler catalysts.

It is optional in the present invention that the above mentioned titanium halide-containing solid ingredient further contains an electron donor compound or a cocatalytic ingredient according to need. Suitable electron donor compounds include oxygen-containing electron donor compounds such as alcohols, phenols, ketones, aldehydes, carboxylic acids, esters of organic or inorganic acid, ethers, acid amides, acid halides, acid anhydrides and the like, nitrogen containing electron donor compounds such as ammonia, amines, nitriles, isocyanates, amides, imines and the like, sulfur-containing electron donor compounds such as thiols, thioethers, sulfate esters, sulfonic acids and the like, silicon-containing electron donor compounds such as silicate esters, organopolysiloxanes, organosilanols and the like, and so on. These electron donor compounds can be used either singly or as a combination of two kinds or more according to need.

The organoaluminum compound as the other essential ingredient in the catalytic composition for polymerization of olefins to be used in the inventive method is a compound represented by the general formula $$AlR^2_mX_{3-m}, \quad (III)$$

in which $R^2$ is a monovalent hydrocarbon group selected from the class consisting of alkyl, aryl and cycloalkyl groups, X ia an atom of halogen and the subscript m is an integer of 1, 2 or 3. Such an organoaluminum compound is exemplified by triethyl aluminum, tri-n propyl aluminum, triisobutyl aluminum, tricyclohexyl aluminum, dimethyl aluminum chloride, diethyl aluminum chloride, di-n-butyl aluminum chloride, dicyclopentyl aluminum chloride, ethyl aluminum sesquichloride and the like. These organoaluminum compounds can be used either singly or as a combination of two kinds or more according to need.

In the catalytic composition consisting of the above described titanium halide-containing solid ingredient and the ingredient of an organoaluminum compound, the proportion of these two ingredients is not particularly limitative.

In step (a) of the inventive method, the catalytic composition for olefin polymerization consisting of the above described titanium halide-containing solid ingredient and the organoaluminmum compound is subjected to a prepolymerization treatment by contacting the same with an olefin.

The olefin used in the above mentioned pre-polymerization treatment should be the same olefin compound which is the olefin monomer to be polymerized by using the stabilized polymerization catalyst prepared according to the inventive method. The olefin compound is an α-olefin represented by the general formula $$R-CH=CH_2, \quad (IV)$$

in which R is a hydrogen atom or a straightly-linear or branched monovalent hydrocarbon group having 1 to 10 carbon atoms. Examples of such an α-olefin include ethylene, propylene, butene-1, pentene-1, hexene-1, 4-methyl pentene-1 and the like though not limited thereto. These olefin compounds can be used either singly or as a combination of two kinds or more according to need. When the stabilized catalyst is intended to be used for the copolymerization of two kinds or more of olefin comonomers, however, it is usually sufficient that the pre polymerization treatment of the catalytic composition is conducted by using only one of the major comonomers.

In the pre-polymerization treatment of step (a) in the inventive method, it is optional according to need that an adjuvant or external electron donor compound is used in combination with the above described catalytic composition for olefin polymerization so as to further enhance the effect of stabilization of the catalyst. The external electron donor compound can be selected from the class of the same compounds as those previously named as the examples of the internal electron donor compounds although it is not essential that the external electron donor compound is a compound of the same kind as the internal electron donor compound already contained in the catalytic composition.

The pre-polymerization treatment in step (a) is conducted by preliminarily polymerizing the olefin monomer in the presence of the above described catalytic composition and, optionally, the external electron donor compound. The pre-polymerization treatment is conducted under a pressure in the range from normal pressure to about 20 kg/cm²G and at a temperature in the range, usually, from room temperature to 90° C. or, preferably, from 30° to 80° C. The temperature should not be too low in view of the problems in the removal of the heat of polymerization and in the low velocity of polymerization. It is usually advantageous to conduct the pre-polymerization treatment in the presence of an inert organic solvent or a known hydrocarbon solvent such as hexane, heptane, kerosene and the like. It is optional to use a chain transfer agent which is preferably hydrogen. When hydrogen is used as a chain transfer agent, the amount thereof should not exceed 20% by moles based on the amount of the olefin to be polymerized in the pre-polymerization treatment.

The amount of the olefin polymerized in this prepolymerization treatment is not particularly limitative but usually in the range from 0.01 to 4000 g of the polymer per m mole of the titanium atoms in the catalytic composition. The pre-polymerization treatment can be performed either in a batch-wise process or in a continuous process.

In step (b) of the inventive method, the catalytic composition after the pre-polymerization treatment in step (a) is brought into contact with carbon monoxide, carbon dioxide or a mixture thereof as a stabilizing agent undiluted or diluted with an inert gas so as to exhibit an effect of stabilization of the catalytic performance. The inert gas above implied is a gas having no detrimental effect on the catalytic activity of the olefin polymerization catalyst such as argon, nitrogen and the like excluding non inert gases such as air, oxygen and the like. The catalytic composition after the pre polymerization treatment should be kept away from contacting with a non-inert gas such as air before the contacting treatment with carbon monoxide and/or dioxide. The catalytic composition subjected to the contacting treatment with the stabilizing agent can be in a dry state as being freed from the solvent or in the form of a suspension in an inert organic solvent. The carbon monoxide and carbon dioxide are used usually as a gas but can be used in the form of a liquid or solid.

Contacting of the catalytic composition after the prepolymerization treatment with carbon monoxide and/or carbon dioxide can be conducted in any of conventional processes for contacting of a gas and a solid or liquid, slurry and a solid or gas, and so on. For example, carbon monoxide or carbon dioxide gas is bubbled into a slurry of the catalytic composition in an inert solvent or the catalytic composition in a dry form or in the form of a slurry is agitated in a closed vessel in the presence of carbon monoxide and/or carbon dioxide in a gaseous or liquid form. Although the above mentioned methods are preferred, alternatively, pulverized dry ice can be blended with the catalytic composition in a dry form or in the form of a slurry. Scrubbers can be used successfully for the purpose.

The amount of the stabilizing agent, i.e. carbon monoxide and/or carbon dioxide, to be brought into contact with the catalytic composition should be at least 0.10 mole or, preferably, at least 0.15 mole per mole of the titanium atoms in the catalytic composition. The temperature for the contacting treatment of the catalytic composition with carbon monoxide and/or carbon dioxide is not particularly limitative but it is usually in the range from 0° to 100° C. or, preferably, from 20° to 50° C. The length of time for the contacting treatment is selected depending on the manner in which the stabilized polymerization catalyst is handled but it is usually at least 600 minutes or, preferably, at least 1000 minutes. When the stabilized catalyst is introduced into the polymerization reactor together with a medium containing the olefin monomer, for example, it is important that the contacting time is selected so as to stabilize the catalyst to such an extent that no in line polymerization of the olefin monomer is caused in the pipe line for the introduction of the mixture into the polymerization reactor. When the stabilized catalyst is stored for a length of time before it is used for the polymerization, the contacting treatment should be undertaken for such a length of time that the performance of the catalyst is not unduly decreased over the period of storage. In short, the conditions for the contacting treatment in step (b) of the inventive method should desirably be selected depending on the type and amount of the catalytic composition, the manner and object of the use thereof and other factors. In short, the conditions of the contacting treatment of the catalytic composition with the stabilizing agent should be selected so as to fully stabilize the catalytic composition. The thus stabilized catalytic composition can be stored over a long period of time without decreasing the potential catalytic activity and exhibits full activity when it is brought under the conditions for the polymerization of an olefin monomer.

The stabilized olefin-polymerization catalyst prepared in the above described manner can be used in the polymerization of an olefin monomer to give quite satisfactory results in respect of the high catalytic activity and increased stereospecificity of the polymer produced therewith and the thus improved catalytic performance is very stable without decreasing over a long period of continued running of the polymerization or storage. The stabilized polymerization catalyst is used in the polymerization of an olefin usually in combination with an organoaluminum compound. The type of the polymerization process is not particularly limitative including the slurry polymerization method, gas-phase polymerization method, bulk polymerization method and the like. Best results of the polymerization can be obtained when the olefin monomer polymerized with the stabilized catalyst is the same olefin compound as used in the prepolymerization treatment of the catalytic composition in step (a) although any different olefin monomers can be polymerized therewith to give an improved result. It is of course that the applicability of the stabilized catalyst prepared according to the inventive method is not limited to the homopolymerization of a single kind of olefin monomers but to the copolymerization of two kinds or more of olefin monomers.

The polymerization temperature is selected depending on the type of the polymerization process, kind of the olefin monomer to be polymerized and other factors. Usually, the polymerization is conducted at a temperature in the range from 20° to 200° C. or, preferably, from 50° to 100° C. under a pressure of, usually, 1 to 50 kg/cm$^2$ G. The molecular weight of the polymer produced by using the catalyst prepared according to the inventive method can be controlled in a known method, for example, by controlling the concentration of hydrogen in the polymerization reactor. The length of time for the polymerization depends on the kind of the olefin monomer and polymerization temperature but the polymerization reaction is complete usually within about 1 to about 10 hours.

As is described above, the present invention provides a novel and convenient method for the preparation of an olefin-polymerization catalyst having excellent catalytic performance such as high polymerization activity and increased stereospecificity of the polymer product along with adequate stabilization of these improved catalytic properties. Accordingly, the polymerization catalyst can be introduced into the polymerization reactor together with a medium containing the olefin monomer without the troubles of blocking of the pipe lines due to the in-line polymerization of the monomer before it is introduced into the polymerization reactor therethrough.

In the following, examples are given to illustrate the method of the invention in more detail but not to limit the scope of the invention in any way.

Example 1

Into a stainless steel-made vessel of 200 liter capacity equipped with a stirrer were introduced, after thorough flushing with nitrogen gas, 80 liters of n-heptane, 2.7 kg of diethyl aluminum chloride and 40 kg of titanium trichloride-AA and then propylene was introduced under pressurization up to a pressure of 0.5 kg/cm$^2$ G and polymerized for 2 hours at 30° C. to effect the pre-polymerization treatment of the catalytic composition, in which about 20 kg of propylene were polymerized. Thereafter, the supernatant was discarded and the solid material left in the vessel was, after 5 times of washing each time with 10 liters of n-heptane, dispersed in 80 liters of n-heptane to make a slurry.

After deaeration of the gaseous phase above the slurry in the vessel, carbon dioxide gas was introduced into the vessel under pressurization up to a pressure of 2.5 kg/cm$^2$ (absolute) and this pressure was maintained for 24 hours at 30° C. to effect the contacting treatment of the catalytic composition with carbon dioxide and to give a stabilized catalyst for the polymerization of olefins. The amount of the carbon dioxide used above was 0.14 mole per mole of the titanium atoms in the catalytic composition. The thus stabilized catalytic composition was kept in liquid propylene for 24 hours with no noticeable changes indicating complete stabilization.

In the next place, 20 g of a polypropylene powder were taken in a stainless steel made autoclave of 5 liter capacity equipped with a stirrer for gas-phase polymerization together with 72 mg of diethyl aluminum chloride and 120 mg as solid of the above prepared stabilized catalytic composition. Hydrogen and propylene were introduced into the autoclave under pressurization up to partial pressures of 5.0 kg/cm$^2$ G and 23.0 kg/cm$^2$ G, respectively, with the stirrer driven and polymerization of propylene was conducted for 2 hours at 70° C. keeping the above mentioned pressure. The activity of the catalyst for the polymerization of propylene corresponded to 2000 q of polypropylene per q of the stabilized catalyst. The stereospecificity of the polypropylene product was estimated by the determination of the isotacticity index (I.I.) of 96.5% by weight which was the weight fraction of the polymer insoluble in boiling n-heptane.

With an object to examine the storage stability of the catalyst, the same polymerization procedure as above was repeated except that the stabilized catalyst was used after storage for 90 days at room temperature in an atmosphere of carbon dioxide gas under a pressure of 0.1 kg/cm$^2$ G. The results were that the activity of the catalyst for the polymerization corresponded to 2000 g of polypropylene per g of the catalyst and the isotacticity index was 96.7% by weight indicating no degradation of the catalytic activity.

The same storage test for stability as above was conducted excepting replacement of the carbon dioxide gas with nitrogen gas. The results were substantially the same as in the storage test under carbon dioxide.

Comparative Example 1

The experimental procedure was substantially the same as in Example 1 described above except that the contacting treatment of the catalytic composition with carbon dioxide was omitted. Namely, the catalytic composition after the pre-polymerization treatment was used in the polymerization of propylene after standing as such in nitrogen for 24 hours at room temperature. The results were that the activity of the catalyst for the polymerization corresponded to 1900 g of polypropylene per g of the catalyst and the isotacticity index was 96.7% by weight showing that the catalytic performance was not particularly inferior as compared with that in Example 1.

With an object to examine the stability of the catalyst, the same polymerization procedure as above was repeated except that the catalyst was used after storage for 90 days at room temperature in an atmosphere of nitrogen gas under a pressure of 0.1 kg/cm$^2$ G. The results were that the activity of the catalyst for the polymerization corresponded to 1300 g of polypropylene per g of the catalyst and the isotacticity index was 96.1% by weight indicating a great degradation of the catalytic performance, in particular, in the activity.

Example 2

A solution prepared by dissolving 500 g of diethyl aluminum chloride in 1 liter of n-heptane was continuously introduced using a plunger pump into a polymerization reactor of 200 liter capacity for continuous-process polymerization equipped with a ribbon blender. Separately, the stabilized catalyst prepared in Example 1 was continuously introduced at a rate of 2.5 g as solid per minute together with propylene as a carrier into the reactor through a stainless steel-made pipe having an inner diameter of 6 mm. An automatic controller was operated in such a manner that hydrogen was continuously introduced under a constant pressure of 0.3 kg/cm$^2$ G and propylene was introduced at such a rate that the total pressure was maintained at 28 kg/cm$^2$ G throughout in the reactor at a temperature of 70° C. The rate of introduction of the diethyl aluminum chloride was such that the amount of the aluminum atoms therein was 10 times by moles of the titanium atoms in the stabilized catalyst.

Running of the polymerization of propylene was continued for 20 days under the above described conditions with no troubles due to blocking of the pipe for the introduction of the catalyst and monomer.

Comparative Example 2

The experimental conditions were substantially the same as in the above described Example 2 excepting the use of the catalyst prepared in Comparative Example 1 in place of the stabilized catalyst. The result was that running of polymerization had to be discontinued already after 40 minutes of running due to blocking of the pipe for the introduction of the catalyst and the monomer due to formation of polypropylene in the pipe.

Example 3

Into a stainless steel-made reaction vessel of 50 liter capacity equipped with a stirrer were introduced, after thorough flushing with nitrogen gas, 0 liters of n-heptane, 1050 g of magnesium diethoxide and 150 g of diethyl phthalate were introduced and then 20 kg of titanium tetrachloride were further added thereto under agitation. The mixture in the vessel was agitated for 2 hours at 110° C. After twice of washing of the solid matter each time with 10 liters of n-heptane, 30 kg of titanium tetrachloride were additionally added to the vessel and the mixture was agitated for 2 hours at 110° C. A carrier-type solid catalytic ingredient was obtained by washing the thus prepared mixture five times each with 10 liters of n-heptane.

The thus prepared solid catalytic ingredient was slurried by adding 30 liters of n-heptane and the slurry was admixed with 150 g of triethyl aluminum and 90 g of diphenyl dimethoxy silane. Further, propylene was introduced under pressurization up to a pressure of 0.4 kg/cm$^2$ G at 60° C. to effect the pre-polymerization treatment of the catalytic ingredient for 10 minutes, by which 36 g of propylene were polymerized. Thereafter, the catalytic ingredient was washed three times each with 25 liters of n-heptane and slurried in 30 liters of n-heptane. The space above the slurry was deaerated and carbon dioxide gas was introduced under pressurization up to a pressure of 3.0 kg/cm$^2$ (absolute) at 30° C. and kept under these conditions for 48 hours with agitation of the slurry so as to contact the catalytic composition with carbon dioxide. The amount of carbon dioxide used above was 13.3 moles per mole of the titanium atoms in the catalytic composition. Further, the thus stabilized catalyst was kept in liquid propylene for 24 hours with no noticeable changes indicating complete stabilization.

In the next place, 20 g of a polypropylene powder were introduced into a stainless steel-made autoclave of 5 liter capacity for gas-phase polymerization equipped with a stirrer and further 230 mg of triethyl aluminum, 120 mg of diphenyl dimethoxy silane and 25 mg of the stabilized catalytic composition prepared above were introduced into the autoclave under agitation. Further, hydrogen and propylene were introduced into the autoclave under pressurization up to partial pressures of 1.0 kg/cm$^2$ G and 27.0 kg/cm$^2$ G, respectively, to effect gas-phase polymerization of propylene for 2 hours at 70° C.

The results were that the catalytic activity corresponded to 20.5 kg of polypropylene per g of the stabilized catalyst and the isotacticity index of the polymer was 97.5% by weight. To examine the storage stability of the catalyst, the same procedure of polymerization was repeated as above excepting the use of the catalyst after storage for 90 days in an atmosphere of carbon dioxide gas at room temperature under a pressure of 0.1 kg/cm$^2$ G. The results were that the catalytic activity corresponded to 19.9 kg of polypropylene per g of the stabilized catalyst and the isotacticity index of the polymer was 97.5% by weight indicating no degradation in the catalytic performance.

Comparative Example 3

The experimental procedure was substantially the same as in Example 3 excepting omission of the treatment of the catalytic composition by contacting with carbon dioxide gas. The results were that the catalytic activity corresponded to 20.1 kg of polypropylene per g of the catalyst and the isotacticity index of the polymer was 97.4% by weight. For further comparison, the same experimental procedure as above was repeated except that the catalyst was used after 90 days of storage at room temperature in an atmosphere of nitrogen gas. The results were that the catalytic activity corresponded to 8.5 kg of polypropylene per g of the catalyst and the isotacticity index of the polymer was 95.8% by weight indicating great degradation of the catalytic performance.

Example 4

A continuous polymerization procedure of propylene was conducted in a similar manner to Example 2 by replacing the stabilized catalyst prepared in Example 1 with the stabilized catalyst prepared in Example 3 introduced at a rate of 0.25 g as solid per minute, replacing the diethyl aluminum chloride with the same amount of triethyl aluminum and additionally adding diphenyl dimethoxy silane in such an amount that the atomic ratio of Ti:Al:Si was 1:200:30. Hydrogen was continuously introduced under a constant pressure of 0.3 kg/cm$^2$ G and propylene was introduced at such a rate that the total pressure was maintained at 28 kg/cm$^2$ G. The polymerization temperature was 70° C. No troubles occurred due to blocking of the pipe for introduction of the catalyst even after 35 days of continued running.

A Comparative Example 4

The same continuous polymerization procedure as in Example 4 was attempted excepting replacement of the stabilized catalyst with the same amount of the same catalyst but without the carbon dioxide treatment as used in Comparative Example 3. The result was that running of the process had to be discontinued shortly after the start of introduction of the catalyst into the reactor due to blocking of the pipe therefor.

Example 5

The experimental procedure was substantially the same as in Example 1 except that the catalytic composition after the pre-polymerization treatment was subjected to a contacting treatment with carbon monoxide gas under a pressure of 5.0 kg/cm$^2$ (absolute) instead of 2.5 kg/cm$^2$ (absolute) of carbon dioxide. The results of the polymerization test were that the activity of the catalyst for the polymerization of propylene corresponded to 2200 g of polypropylene per g of the catalyst and the isotacticity index of the polymer was 96.7%. The amount of carbon monoxide used above was 0.17 mole per mole of the titanium atoms in the catalytic composition. Further, the thus stabilized catalytic composition was kept in liquid Propylene for 24 hours with no noticeable changes indicating complete stabilization.

The above described results of the polymerization test were substantially unchanged even when the stabilized catalyst was used after storage for 90 days at room temperature in an atmosphere of carbon monoxide gas under a pressure of 0.1 kg/cm$^2$ G excepting a slight decrease of the activity corresponding to 2100 g of polypropylene per g of the catalyst.

Comparative Example 5

The experimental procedure was substantially the same as in Example 1 including the contacting treatment with carbon dioxide except that the pressure of the carbon dioxide was 0.4 kg/cm$^2$ (absolute) corresponding to 0.023 mole of carbon dioxide per mole of the titanium atoms in the catalytic composition.

The polymerization test of propylene using this catalyst was attempted in the same manner as in Example 1 but could not be performed due to immediate blocking of the pipe line for introduction of the catalyst and the monomer.

Example 6

The same experimental procedure for continuous polymerization of propylene as in Example 2 was undertaken excepting replacement of the catalyst with the carbon monoxide-stabilized catalyst prepared in Example 5 described above. The result was that the polymerization run could be continued for more than 20 days without blocking of the pipe line for introduction of the catalyst and the monomer due to in-line formation of polypropylene.

What is claimed is:

1. A method for the preparation of a catalyst for the polymerization of an olefin having stabilized catalytic performance which comprises the steps of:
    (a) subjecting a catalytic composition comprising a titanium halide-containing solid ingredient and an organoaluminum compound to a pre-polymerization treatment by contacting with an olefin monomer; and
    (b) bringing the catalytic composition after the pre polymerization treatment in step (a) into contact with a stabilizing agent which is carbon monoxide, carbon dioxide or a mixture thereof undiluted or diluted with an inert gas until substantial disappearance of the activity for the polymerization of olefins, the amount of the stabilizing agent being at least 0.15 mole per mole of the titanium atoms in the catalytic composition.

2. The method for the preparation of a catalyst for the polymerization of an olefin as claimed in claim 1 wherein the catalytic composition after the pre polymerization treatment in step (a) is contacted with the stabilizing agent for at least 600 minutes.

3. The method for the preparation of a catalyst for the polymerization of an olefin as claimed in claim 1 wherein the pre-polymerization treatment is carried out at a temperature in the range from room temperature to 90° C.

4. The method for the preparation of a catalyst for the polymerization of an olefin as claimed in claim 1 wherein the pre-polymerization treatment is carried out under a pressure in the range from normal pressure to 20 kg/cm$^2$ G.

5. The method for the preparation of a catalyst for the polymerization of an olefin as claimed in claim 1 wherein the stabilizing agent is carbon dioxide.

6. The method for the preparation of a catalyst for the polymerization of an olefin as claimed in claim 1 wherein the stabilizing agent is in the form of a gas.

7. The method for the preparation of a catalyst for the polymerization of an olefin as claimed in claim 1 wherein the temperature in step (b) is in the range from 20° to 60° C.

* * * * *